US012689815B2

(12) United States Patent
Zhang et al.

(10) Patent No.: US 12,689,815 B2
(45) Date of Patent: Jul. 21, 2026

(54) CAMERA MODULE AND ELECTRONIC DEVICE

(71) Applicant: VIVO MOBILE COMMUNICATION CO., LTD., Dongguan (CN)

(72) Inventors: Yiwen Zhang, Dongguan (CN); Jun Sun, Dongguan (CN); Qing Ye, Dongguan (CN); Biao Huang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 142 days.

(21) Appl. No.: 18/665,281

(22) Filed: May 15, 2024

(65) Prior Publication Data

US 2024/0314415 A1     Sep. 19, 2024

Related U.S. Application Data

(63) Continuation of application No. PCT/CN2022/131769, filed on Nov. 14, 2022.

(30) Foreign Application Priority Data

Nov. 17, 2021    (CN) .......................... 202111363313.X

(51) Int. Cl.
*H04N 23/54* (2023.01)
(52) U.S. Cl.
CPC ................................... *H04N 23/54* (2023.01)
(58) Field of Classification Search
CPC ........ H04N 23/54; H04N 23/55; H04N 23/57; H04N 23/685; H04N 23/687; G03B 2205/0038

USPC .......................................................... 348/374
See application file for complete search history.

(56) References Cited

U.S. PATENT DOCUMENTS

| | | | | | |
|---|---|---|---|---|---|
| 2006/0115256 | A1* | 6/2006 | Nomura | ................ | H04N 23/54 |
| | | | | | 348/E5.046 |
| 2007/0002147 | A1 | 1/2007 | Nomura et al. | | |
| 2007/0092234 | A1* | 4/2007 | Liao | ....................... | H04N 23/55 |
| | | | | | 348/E5.046 |

(Continued)

FOREIGN PATENT DOCUMENTS

| | | |
|---|---|---|
| CN | 111556239 A | 8/2020 |
| CN | 112343778 A | 2/2021 |

(Continued)

*Primary Examiner* — Anthony J Daniels
(74) *Attorney, Agent, or Firm* — The Webb Law Firm

(57) ABSTRACT

A camera module includes a base frame, a photosensitive chip, a first substrate, a first driving mechanism, a first guide post, a second substrate, a second guide post, and a second driving mechanism. The first guide post is disposed on the base frame, the first substrate is movably connected to the first guide post and is capable of moving along an extension direction of the first guide post; the photosensitive chip is disposed on the second substrate, the second guide post is disposed on the first substrate, the second substrate is movably connected to the first guide post, and the second substrate moves along an extension direction of the second guide post; the first driving mechanism includes a first driving motor, and the first driving motor is disposed on the base frame and is connected to the first substrate; and the second driving mechanism includes a second driving motor.

19 Claims, 2 Drawing Sheets

(56)                    References Cited

U.S. PATENT DOCUMENTS

| | | | |
|---|---|---|---|
| 2009/0091632 A1* | 4/2009 | Okamoto | H04N 23/54 348/208.7 |
| 2009/0128673 A1* | 5/2009 | Okamoto | H04N 23/54 348/294 |
| 2010/0149409 A1* | 6/2010 | Chiang | H04N 23/54 348/374 |
| 2023/0077936 A1 | 3/2023 | Xu | |

FOREIGN PATENT DOCUMENTS

| | | | |
|---|---|---|---|
| CN | 112788241 A | 5/2021 | |
| CN | 113395445 A | 9/2021 | |
| JP | 2011158552 A | 8/2011 | |

* cited by examiner

512/522    320/420    321/421

513/523

CAMERA MODULE AND ELECTRONIC DEVICE

CROSS-REFERENCE TO RELATED APPLICATIONS

This application is a Bypass Continuation Application of International Patent Application No. PCT/CN2022/131769 filed Nov. 14, 2022, and claims priority to Chinese Patent Application No. 202111363313.X filed Nov. 17, 2021, the disclosures of which are hereby incorporated by reference in their entireties.

BACKGROUND OF THE INVENTION

Field of the Invention

This application pertains to the field of communications device technologies, and in particular, to a camera module and an electronic device.

Description of Related Art

With the development of technology, electronic devices (such as mobile phones and tablet computers) have developed considerably. As a tool with the powerful function, the electronic devices greatly facilitate the life and work of the user. The camera function is the basic function of the electronic device, which can meet the shooting demand of the user. The camera function is usually realized by the camera module of the electronic device.

SUMMARY OF THE INVENTION

An embodiment of this application provides a camera module, including a base frame, a photosensitive chip, a first substrate, a first driving mechanism, a first guide post, a second substrate, a second guide post, and a second driving mechanism, where the first guide post is disposed on the base frame, the first substrate is movably connected to the first guide post, and the first substrate is able to move along an extension direction of the first guide post;

the photosensitive chip is disposed on the second substrate, the second guide post is disposed on the first substrate, the second substrate is movably connected to the first guide post, and the second substrate moves along an extension direction of the second guide post;

the first driving mechanism includes a first driving motor, the first driving motor is disposed on the base frame and is connected to the first substrate, and the first driving motor drives the second substrate and the photosensitive chip to move in a first direction by driving the first substrate to move; and the second driving mechanism includes a second driving motor, the second driving motor is disposed on the base frame or the first substrate and is connected to the second substrate, and the second driving motor enables the photosensitive chip to move in a second direction by driving the second substrate.

An embodiment of this application further provides an electronic device, including the camera module.

REFERENCE NUMERALS

100—base frame, 200—photosensitive chip, 300—first substrate, 310—first board body, 311—first clamping component, 320—first extension component, 321—first protrusion, 400—second substrate, 410—second board body, 411—second clamping component, 420—second extension component, 421—second protrusion, 510—first driving mechanism, 511—first driving motor, 512—first screw rod, 513—first driving board, 514—first gear set, 515—first elastic member, 520—second driving mechanism, 521—second driving motor, 522—second screw rod, 523—second driving board, 524—second gear set, 525—second elastic member, 610—first guide post, and 620—second guide post.

DESCRIPTION OF THE INVENTION

The following clearly describes technical solutions in embodiments of this application with reference to accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing an order or sequence. It should be understood that the data used in such a way is interchangeable in proper circumstances so that the embodiments of this application can be implemented in an order other than the order illustrated or described herein. In addition, in this specification and the claims, "and/or" represents at least one of connected objects, and a character "/" generally represents an "or" relationship between associated objects.

The user usually holds the electronic device to take pictures, and the quality of the images taken by the electronic device is poor due to jitter in the hand-held shooting process.

The following describes the camera module provided in the embodiments of this application through embodiments and application scenarios thereof with reference to the accompanying drawings.

Figure 1:
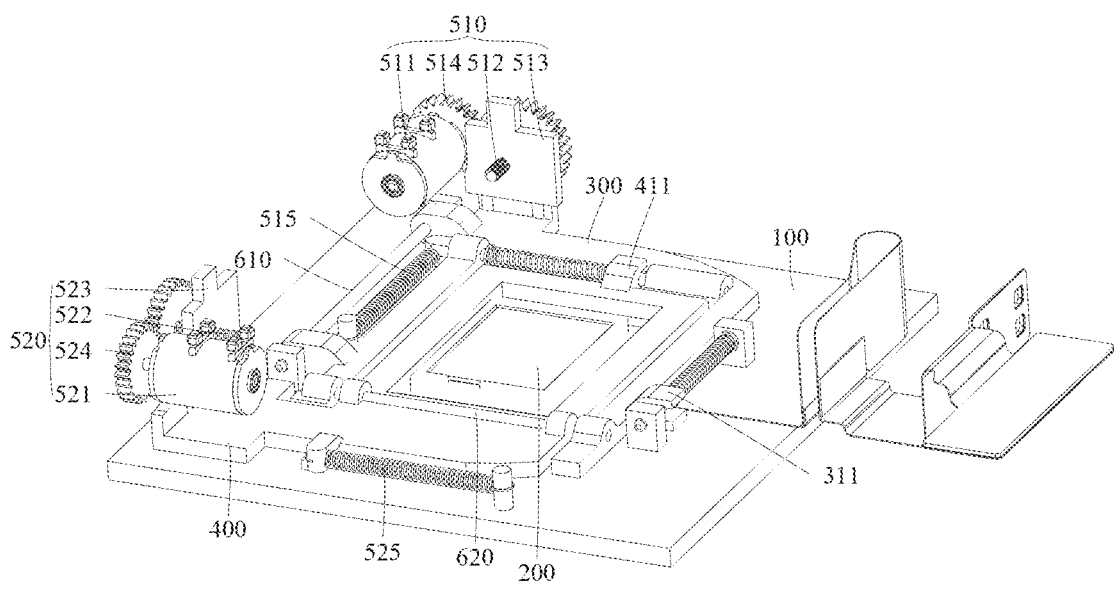
FIG. 1 is a schematic diagram of a structure of a camera module according to an embodiment of this application.
Figure 2:
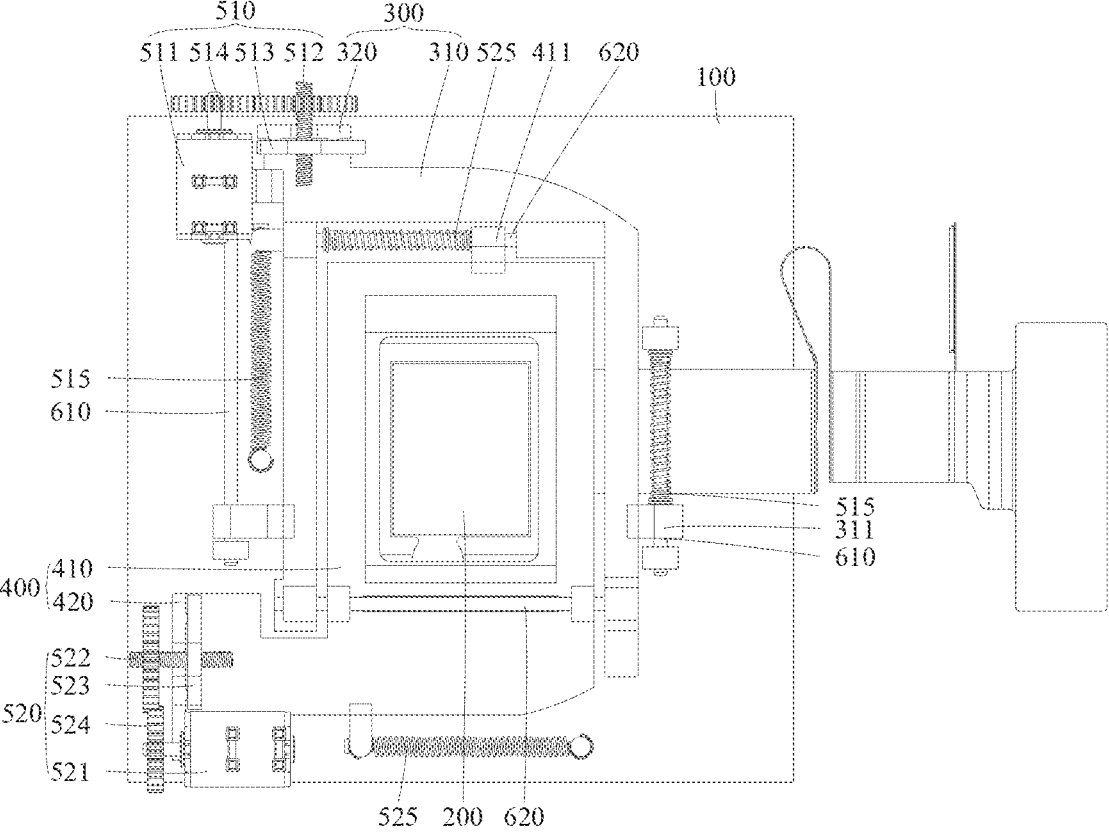
FIG. 2 is a top view of a camera module according to an embodiment of this application.
Figure 3:
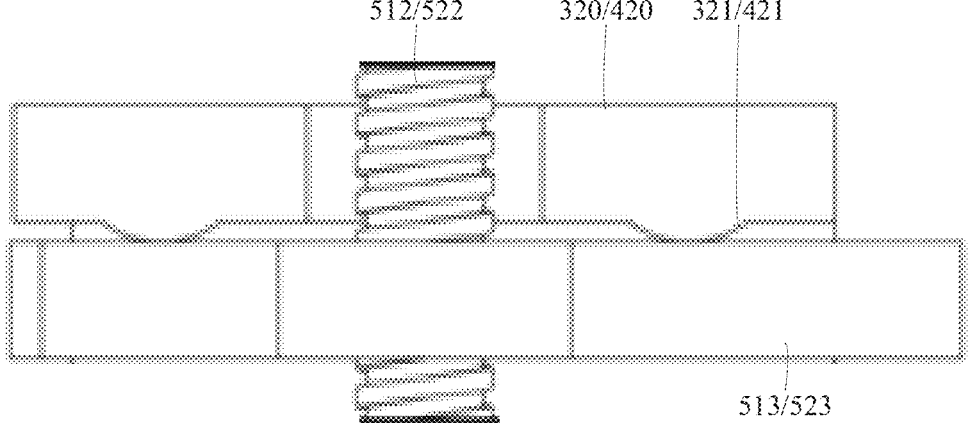
FIG. 3 is a partial sectioned diagram of a camera module according to an embodiment of this application.

Referring to FIG. 1 to FIG. 3, an embodiment of this application discloses a camera module, the disclosed camera module includes a base frame 100, a lens, a photosensitive chip 200, a first substrate 300, a first driving mechanism 510, a first guide post 610, a second substrate 400, a second guide post 620, and a second driving mechanism 520.

The base frame 100 provides a mounting foundation for other components of the camera module. The first guide post 610 is disposed on the base frame 100, and in this case, the first guide post 610 is fixed on the base frame 100. The first substrate 300 is movably connected to the first guide post 610, and the first substrate 300 can move along an extension direction of the first guide post 610, that is, the first substrate 300 moves relative to the base frame 100 along the extension direction of the first guide post 610.

The second guide post 620 is disposed on the first substrate 300, that is, the second guide post 620 is fixed on the first substrate 300. The second substrate 400 is movably connected to the first guide post 610, and the second substrate 400 moves along an extension direction of the second guide post 620. That is, the second substrate 400 moves relative to the first substrate 300 along the extension direction of the second guide post 620.

The photosensitive chip 200 is disposed on the second substrate 400. Optionally, the photosensitive chip 200 can be bonded to the second substrate 400, and certainly, the photosensitive chip 200 can also be connected to the second substrate 400 in other manners, which is not limited herein.

The lens is disposed on the base frame 100, the photosensitive chip 200 is opposite to the lens, and the photosensitive chip 200 can be electrically connected to a motherboard of the electronic device through a flexible printed circuit board. In this case, the external light enters the photosensitive chip 200 through the lens, and the photosensitive chip 200 converts the optical signal into an electrical signal and transmits the electrical signal to the motherboard, thus realizing the shooting function of the camera module.

The first driving mechanism 510 includes a first driving motor 511, the first driving motor 511 is disposed on the base frame 100 and connected to the first substrate 300. The first driving motor 511 drives the first substrate 300 to move, thereby driving the second substrate 400 and the photosensitive chip 200 to move in a first direction, where the first direction is parallel to the extension direction of the first guide post 610, which can also be understood as that the first direction is the extension direction of the first guide post 610.

The second driving mechanism 520 includes a second driving motor 521, the second driving motor 521 is disposed on the base frame 100 or the first substrate 300 and is connected to the second substrate 400. The second driving motor 521 enables the photosensitive chip 200 to move in the second direction by driving the second substrate 400. The second direction herein is parallel to the extension direction of the second guide post 620, which can also be understood as that the second direction is the extension direction of the second guide post 620.

In this embodiment disclosed in this application, because the second substrate 400 is movably connected to the first substrate 300 through the second guide post 620, when the first driving motor 511 drives the first substrate 300 to move, the first substrate 300 can drive the second substrate 400 and the photosensitive chip 200 to move together. In addition, the second substrate 400 is movably connected to the second guide post 620, and the second substrate 400 and the first substrate 300 can also move relative to each other, so that when the second driving motor 521 drives the second substrate 400 to move, the second substrate 400 can also independently drive the photosensitive chip 200 to move. Both the first substrate 300 and the second substrate 400 can drive the photosensitive chip 200 to move, so that the jitter amount of the camera module can be compensated, and then the anti-jitter function can be realized to improve the image shooting quality of the electronic device.

In addition, the first guide post 610 guides the first substrate 300, and the second guide post 620 guides the second substrate 400, so the first guide post 610 and the second guide post 620 can guide and limit a moving direction of the photosensitive chip 200, thereby improving the moving accuracy of the photosensitive chip 200, preventing the photosensitive chip 200 from tilting or deviating during the moving process, and thus enabling the anti-jitter performance of the camera module to be better.

In addition, both the first substrate 300 and the second substrate 400 can move, so it is not easy for the first substrate 300 and the second substrate 400 to interact with each other, so that the camera module can move independently in two directions, and then the camera module can compensate in two directions, so as to improve the anti-jitter compensation range of the camera module.

In this embodiment disclosed in this application, both the first substrate 300 and the second substrate 400 are driven by a driving motor, and compared with the electromagnetic driving manner, the driving motor does not magnetize the components on the photosensitive chip 200, thus improving the security performance of the camera module.

In the anti-jitter process of the camera module, when the electronic device or a gyroscope inside the camera module detects that the camera module is tilted, the gyroscope transmits obtained data such as a tilt angle of the camera module to a control chip, and the control chip inputs a corresponding angle compensation amount. The control chip controls the first substrate 300 and the second substrate 400 to move through the first driving mechanism 510 and the second driving mechanism 520, and the first substrate 300 and the second substrate 400 drive the photosensitive chip 200 to realize angle compensation, thus realizing anti-jitter function of the camera module.

The first guide post 610 in the above embodiment can be welded to the base frame 100. Certainly, the first guide post 610 can also be connected to the base frame 100 in other manners, which is not limited herein. The connection manner between the second guide post 620 and the first substrate 300 may be the same as that between the first guide post 610 and the base frame 100.

In the above embodiment, the second driving motor 521 may be disposed on the base frame 100 or the first substrate 300. When the second driving motor 521 is disposed on the first substrate 300, the first substrate 300 also drives the second driving motor 521 to move. When the second driving motor 521 is disposed on the base frame 100, the second driving motor 521 and the second substrate 400 need to avoid moving along the moving direction of the first substrate 300, so as to avoid a situation that the first substrate 300 cannot move. A structure in which the second driving motor 521 is disposed on the base frame 100 will be described in detail below, and will not be repeated herein again.

Optionally, the extension direction of the first guide post 610 and the extension direction of the second guide post 620 can be parallel, that is, the moving direction of the first substrate 300 and the moving direction of the second substrate 400 are the same, so the first direction and the second direction are the same. This solution can increase the compensation range of the jitter amount of the photosensitive chip 200 in the same direction.

Certainly, the extension direction of the first guide post 610 may intersect with the extension direction of the second guide post 620, that is, the first direction intersects with the second direction. In this case, the extension direction of at least one of the first guide post 610 or the second guide post 620 can be along a length direction or a width direction of the photosensitive chip 200, and the extension direction of the other can be along a thickness direction of the photosensitive chip 200, that is, the extension direction of the other can be perpendicular to a photosensitive surface of the photosensitive chip 200. In this case, the guide post perpendicular to the photosensitive surface of the photosensitive chip 200 is used to realize a focusing function of the photosensitive chip 200.

In another optional embodiment, the extension direction of the first guide post 610 may intersect with the extension direction of the second guide post 620, and a plane in which the first guide post 610 and the second guide post 620 are located may be parallel to a plane in which the photosensitive chip 200 is located. In this solution, the photosensitive chip 200 can move along the plane in which the photosensitive chip 200 is located, so the photosensitive chip 200 can move in two different directions, which improves the anti-jitter range of the photosensitive chip 200.

The extension direction of the first guide post 610 may be perpendicular to the extension direction of the second guide post 620. In this case, the extension direction of the first guide post 610 may be parallel to the length direction of the photosensitive chip 200. The extension direction of the second guide post 620 may be parallel to the width direction of the photosensitive chip 200.

In the above embodiment, the first driving mechanism 510 may further include a first transmission member, and the first driving motor 511 is drivingly connected to the first substrate 300 through the first transmission member. Optionally, the first driving mechanism 510 may include a first screw rod 512, and the first driving motor 511 may be in threaded connection with the first substrate 300 through the first screw rod 512. In this case, the first substrate 300 is moved through the rotation of the first screw rod 512. However, because an area of thrust surface of the first screw rod 512 on the first substrate 300 is small, it is easy to cause the first substrate 300 to be stressed only on one side, resulting in uneven stress on the first substrate 300, which causes the first substrate 300 to tilt when moving.

Based on this, in another optional embodiment, the first transmission member may further include a first driving board 513 and a first elastic member 515, the first screw rod 512 may be connected to the first driving motor 511, the first substrate 300 may be provided with a first through hole, the first screw rod 512 may pass through the first through hole and be in threaded connection with the first driving board 513, the first driving board 513 may be in contact with the first substrate 300, and the first driving motor 511 may drive the first substrate 300 to move through the first screw rod 512 and the first driving board 513. One end of the first elastic member 515 can be connected to the base frame 100, and the other end of the first elastic member 515 can be connected to the first substrate 300. An expansion direction of the first elastic member 515 is parallel to the extension direction of the first guide post 610.

In an operation process, when the camera module performs anti-jitter operation, the first driving motor 511 drives the first screw rod 512 to rotate, the first screw rod 512 drives the first driving board 513 to move, and the first driving board 513 is in contact with the first substrate 300. In this case, the first elastic member 515 is compressed, and the first driving board 513 can drive the first substrate 300 to move along the moving direction thereof, thus realizing anti-jitter. When the first substrate 300 is restored to an original position, the first driving motor 511 drives the first screw rod 512 to rotate in the opposite direction, so that the first driving board 513 removes the acting force on the first substrate 300, and the first elastic member 515 recovers the elastic deformation, thereby driving the first substrate 300 to restore to the original position. The original position herein is the position of the photosensitive chip 200 before the anti-jitter operation.

In this solution, the first driving board 513 is in contact with the first substrate 300. In this case, a contact area between the first driving board 513 and the first substrate 300 is relatively large, so that the first substrate 300 is more balanced in stress, and the first substrate 300 is less prone to tilt when moving.

In the above embodiment, in order to prevent the first screw rod 512 from driving the first driving board 513 to rotate, the gravity of the first driving board 513 should be greater than the friction between the first driving board 513 and the first screw rod 512. In this case, the first screw rod 512 can only drive the first driving board 513 to move without driving the first driving board 513 to rotate together.

Optionally, the first elastic member 515 can be a spring, and certainly be other elastic members, which is not limited herein.

In another optional embodiment, the first substrate 300 may include a first board body 310 and a first extension component 320 of the first board body 310 extending away from a side of the base frame 100, the first guide post 610 is movably connected to the first board body 310, the first through hole is opened in the first extension component 320, and the first driving board 513 is in contact with the first extension component 320.

In this solution, the first board body 310 is used to be connected to the first guide post 610, so the area of the first board body 310 is large, which is used to provide the installation space for the second substrate 400. The first extension component 320 is used to contact with the first driving board 513, so a volume thereof can be set smaller, which enables the structure of the first substrate 300 to be relatively simple and compact.

In the above embodiment, the first extension component 320 and the first driving board 513 are too tightly attached, which may easily cause the first extension component 320 and the first driving board 513 to stick together.

In another optional embodiment, a side of the first extension component 320 towards the first driving board 513 may be provided with a first protrusion 321, and the first driving board 513 is in contact with the first protrusion 321; or a side of the first driving board 513 towards the first extension component 320 is provided with a first protrusion 321, and the first extension component 320 may be in contact with the first protrusion 321. In this solution, the first protrusion 321 enables a specific gap to be formed between the first extension component 320 and the first driving board 513, so as to prevent the first extension component 320 from sticking to the first driving board 513 too tightly, causing the first extension component 320 to stick to the first driving board 513.

In another optional embodiment, the number of the first guide posts 610 is at least two, the at least two first guide posts 610 may be respectively located at opposite sides of the first board body 310, extension directions of the at least two first guide posts 610 are in parallel. In this solution, both sides of the first substrate 300 are provided with the first guide posts 610, so the first guide posts 610 on both sides can uniformly support the first substrate 300, thereby preventing the first substrate 300 from tilting to one side during the movement, and improving the anti-jitter performance of the camera module.

In another optional embodiment, the number of the first elastic members 515 is at least two, and at least one first elastic member 515 can be sleeved on the first guide post 610. In this solution, at least one first elastic member 515 can be sleeved on the first guide post 610, and the mounting space of the first elastic member 515 can be compressed on the base frame 100, thus enabling the structure of the camera module to be more optimized.

In another optional embodiment, the first board body 310 has a first side and a second side that are disposed oppositely, the first side may be provided with a first clamping component 311, the second side may be provided with a first guide hole penetrating through the first board body 310. One of the first guide posts 610 is in clamped connection with the first clamping component 311, and another first guide post 610 may be sleeved in the first guide hole. In this solution, the first clamping component 311 is in an open structure, and therefore can be directly clamped on the first guide post 610. In the assembly process, one of the first guide posts 610 can be sleeved in the first guide hole first, and then the first guide post 610 on the other side can be clamped into the first clamping component 311 after other parts of the base frame 100 and the first guide post 610 are installed, so that the first substrate 300 will not affect the installation of other parts of the base frame 100, and the installation of the camera module is less difficult.

In another optional embodiment, one of the first elastic members 515 may be sleeved on the first guide post 610 corresponding to the first clamping component 311, and one end of the first elastic member 515 is connected to the first clamping component 311. In this solution, because the first clamping component 311 protrudes from the first board body 310, a volume thereof can be set smaller, so a larger installation position can be reserved for the first elastic member 515 on the first guide post 610, so that the length of the first guide post 610 can be set shorter, and the overall volume of the camera module is smaller.

In another optional embodiment, the first transmission member further includes a first gear set 514, the first driving motor 511 and the first screw rod 512 are connected through the first gear set 514, and the first driving motor 511 may drive the first screw rod 512 to rotate through the first gear set 514. In this solution, the transmission direction of the power of the first driving motor 511 can be changed through the first gear set 514, so that the setting positions of the first driving mechanism 510 and the first substrate 300 are more flexible. In addition, by changing diameters of gears in the first gear set 514, a moving rate of the first substrate 300 can be increased or decreased, thus meeting the anti-jitter requirements of the camera module.

In the above embodiment, the base frame 100 is provided with a first supporting protrusion for supporting the first screw rod 512, and the first screw rod 512 can rotate relatively to the first supporting protrusion.

In the above embodiment, the second driving motor 521 can be disposed on the first substrate 300. In this case, when moving, the first substrate 300 drives the second driving motor 521 to move, thus increasing the weight of the first substrate 300, thus easily affecting the moving rate of the first substrate 300.

Based on this, in another optional embodiment, the second driving motor 521 may be disposed on the base frame 100. The second driving mechanism 520 may further include a second transmission member, the second transmission member includes a second screw rod 522, a second driving board 523, and a second elastic member 525, the second substrate 400 may be provided with a second through hole, the second screw rod 522 may pass through the second through hole and is in threaded connection with the second driving board 523, the second driving board 523 may be in contact with the second substrate 400, and the second driving motor 521 may drive the second substrate 400 to move through the second screw rod 522 and the second driving board 523.

The second screw rod 522 can move along the extension direction of the first guide post relative to the second through hole.

One end of the second elastic member 525 is connected to the base frame 100 and/or the first substrate 300, the other end of the second elastic member 525 is connected to the second substrate 400, and an expansion direction of the second elastic member 525 may be parallel to the extension direction of the second guide post 620.

In this solution, the second driving motor 521 is disposed on the base frame 100, so the weight of the first substrate 300 is relatively small, thereby improving the moving rate of the first substrate 300.

In this embodiment, the second screw rod 522 can move along the extension direction of the first guide post relative to the second through hole.

During the movement of the first substrate 300, the second substrate 400 can avoid the second screw rod 522 through the second through hole, so that the second substrate 400 can move with the first substrate 300, thus avoiding the situation that the first substrate 300 is pinned.

In an operation process, when the camera module performs anti-jitter operation, the second driving motor 521 drives the second screw rod 522 to rotate, the second screw rod 522 drives the second driving board 523 to move, and the second driving board 523 is in contact with the second substrate 400. In this case, the second elastic member 525 is compressed, and the second driving board 523 can drive the second substrate 400 to move along the moving direction thereof, thus realizing anti-jitter. When the second substrate 400 is restored to an original position, the second driving motor 521 drives the second screw rod 522 to rotate in the opposite direction, so that the second driving board 523 removes the acting force on the second substrate 400, and the second elastic member 525 recovers the elastic deformation, thereby driving the second substrate 400 to restore to the original position. The original position herein is the position of the photosensitive chip 200 before the anti-jitter operation.

In the above embodiment, the second driving board 523 is in contact with the second substrate 400. In this case, a contact area between the second driving board 523 and the second substrate 400 is relatively large, so that the second substrate 400 is more balanced in stress, and the second substrate 400 is less prone to tilt when moving.

In the above embodiment, in order to prevent the second screw rod 522 from driving the second driving board 523 to rotate, the gravity of the second driving board 523 should be greater than the friction between the second driving board 523 and the second screw rod 522. In this case, the second screw rod 522 can only drive the second driving board 523 to move without driving the second driving board 523 to rotate together.

Optionally, the second elastic member 525 can be a spring, and certainly be other elastic members, which is not limited herein. The second through hole may be a strip hole, and an extension direction of the strip hole may be the same as the extension direction of the first guide post 610.

In another optional embodiment, the second substrate 400 may include a second board body 410 and a second extension component 420 of the second board body 410 extending away from a side of the base frame 100, the second guide post 620 may be movably connected to the second board body 410. The second through hole is opened in the second extension component 420, and the second driving board 523 may be in contact with the second extension component 420. In this solution, the second board body 410 is used to be connected to the second guide post 620, so the area of the second board body 410 is large, which is used to provide the installation space for the photosensitive chip 200. The second extension component 420 is used to contact with the second driving board 523, so a volume thereof can be set smaller, which enables the structure of the second substrate 400 to be relatively simple and compact.

In the above embodiment, the second extension component 420 and the second driving board 523 can slide relative to each other along the extension direction of the first guide post 610, and the first extension component 320 and the second driving board 523 are attached too tightly, which may easily cause excessive friction between the second extension component 420 and the second driving board 523, thus affecting the moving rate of the first substrate 300 and the second substrate 400 along the extension direction of the first guide post 610, and affecting the anti-jitter performance of the camera module.

Based on this, in another optional embodiment, the side of the second extension component 420 towards the second driving board 523 is provided with a second protrusion 421, and the second driving board 523 can contact with the second protrusion 421. In this solution, the second protrusion 421 can reduce a contact surface area between the second driving board 523 and the second extension component 420, thus reducing the friction between the second extension component 420 and the second driving board 523, making it easy for the second extension component 420 and the second driving board 523 to slide relative to each other, and not easily affecting the moving rate of the first substrate 300 and the second substrate 400 along the extension direction of the first guide post 610, so as to improve the anti-jitter performance of the camera module.

Alternatively, in another optional embodiment, a side of the second driving board 523 towards the second extension component 420 may be provided with a second protrusion 421, and the second extension component 420 may be in contact with the second protrusion 421. The effect achieved in this solution is the same as that in the above solution, and details are not described herein again.

In addition, in above two solutions, the second protrusion 421 enables a specific gap to be formed between the second extension component 420 and the second driving board 523, so as to prevent the second extension component 420 from sticking to the second driving board 523 too tightly, causing the second extension component 420 to stick to the second driving board 523.

In another optional embodiment, the number of the second guide posts 620 is at least two, the at least two second guide posts 620 may be respectively located at opposite sides of the second board body 410, extension directions of the at least two second guide posts 620 are in parallel. In this solution, both sides of the second substrate 400 are provided with the second guide posts 620, so the second guide posts 620 on both sides can uniformly support the second substrate 400, thereby preventing the second substrate 400 from tilting to one side during the movement, and improving the anti-jitter performance of the camera module.

In another solution, the number of the second elastic members 525 may be at least two, and at least one second elastic member 525 can be sleeved on the second guide post 620. In this solution, at least one second elastic member 525 is sleeved on the second guide post 620, and the mounting space of the second elastic member 525 can be compressed on the base frame 100 or the first substrate 300, thus enabling the structure of the camera module to be more optimized.

In another optional embodiment, the second board body 410 may have a third side and a fourth side that are disposed oppositely, the third side may be provided with a second clamping component 411, the fourth side may be provided with a second guide hole penetrating through the second board body 410. One of the second guide posts 620 may be in clamped connection with the second clamping component 411, and another second guide post 620 may be sleeved in the second guide hole. In this solution, the second clamping component 411 is in an open structure, and therefore can be directly clamped on the second guide post 620. In the assembly process, one of the second guide posts 620 can be sleeved in the second guide hole first, and then the second guide post 620 on the other side can be clamped into the second clamping component 411 after other parts of the base frame 100 and the second guide post 620 are installed, so that the second substrate 400 will not affect the installation of other parts of the base frame 100, and the installation of the camera module is less difficult.

In another optional embodiment, one end of one of the second elastic members 525 may be connected to the base frame 100, the other end is connected to the second substrate 400. Another second elastic member 525 may be sleeved on the second guide post 620 corresponding to the second clamping component 411 with one end being connected to the first substrate 300 and the other end being connected to the second clamping component 411. In this solution, because the second clamping component 411 protrudes from the second board body 410, a volume thereof can be set smaller, so a larger installation position can be reserved for the second elastic member 525 on the second guide post 620, so that the length of the second guide post 620 can be set shorter, and the overall volume of the camera module is smaller.

In another optional embodiment, the second transmission member may further include a second gear set 524, the second driving motor 521 and the second screw rod 522 are connected through the second gear set 524, and the second driving motor 521 may drive the second screw rod 522 to rotate through the second gear set 524. In this solution, the transmission direction of the power of the second driving motor 521 can be changed through the second gear set 524, so that the setting positions of the second driving mechanism 520 and the second substrate 400 are more flexible. In addition, by changing diameters of gears in the second gear set 524, a moving rate of the second substrate 400 can be increased or decreased, thus meeting the anti-jitter requirements of the camera module.

In the above embodiment, the base frame 100 is provided with a second supporting protrusion for supporting the second screw rod 522, and the second screw rod 522 can rotate relatively to the second supporting protrusion.

In another optional embodiment, the first substrate 300 may be provided with an avoidance opening, and a part of the second substrate 400 may be located in the avoidance opening. This solution can reduce a stacking height of the first substrate 300 and the second substrate 400, which is beneficial to the thin and light development of the camera module.

The second substrate 400 can be provided with an avoidance hole, and at least part of the photosensitive chip 200 can be located in the avoidance hole, thereby reducing the volume of the camera module.

In this embodiment disclosed in this application, the base frame 100 may include a base and a top board, and only a part of the base frame 100, namely the base, is shown in FIG. 1 disclosed in this application, and the top board is not shown. In this case, the first guide post 610 may be disposed on the base, and the lens may be disposed on the top board.

In another optional embodiment, the camera module disclosed in this application may further include at least one detection element, the detection element can be disposed on the base frame 100 and can be used to detect an offset angle of the lens relative to the photosensitive chip 200. In this solution, the detection element can measure the offset angle of the photosensitive chip 200 in real time, thus ensuring the anti-jitter effect of the camera module. Optionally, the detection element may be a Hall chip, and certainly be other types of chips, which is not limited herein.

In the operation process, when the photosensitive chip 200 moves, the detection element can detect the offset angle of the photosensitive chip 200, and the detection signal can be fed back to the control chip, so as to correct the offset position of the photosensitive chip 200.

Based on the camera module disclosed in the embodiments of this application, an embodiment of this application further discloses an electronic device. The disclosed electronic device includes the camera module in any one of the foregoing embodiments.

The electronic device in this embodiment of this application may be a device, such as a smart phone, a tablet computer, an e-book reader, a wearable device (for example, a smart phone), a video game console, and the like. A type of the electronic device is not limited in this embodiment of this application.

The embodiments of this application are described above with reference to the accompanying drawings, but this application is not limited to the foregoing implementations, and the foregoing implementations are only illustrative and not restrictive. Under the enlightenment of this application, a person of ordinary skill in the art can make many forms without departing from the purpose of this application and the protection scope of the claims, all of which fall within the protection of this application.

What is claimed is:

1. A camera module, comprising a base frame, a photosensitive chip, a first substrate, a first driving mechanism, a first guide post, a second substrate, a second guide post, and a second driving mechanism, wherein the first guide post is disposed on the base frame, the first substrate is movably connected to the first guide post, and the first substrate is capable of moving along an extension direction of the first guide post;

the photosensitive chip is disposed on the second substrate, the second guide post is disposed on the first substrate, the second substrate is movably connected to the second guide post, and the second substrate moves along an extension direction of the second guide post;

the first driving mechanism comprises a first driving motor, the first driving motor is disposed on the base frame and is connected to the first substrate, and the first driving motor drives the second substrate and the photosensitive chip to move in a first direction by driving the first substrate to move; and the second driving mechanism comprises a second driving motor, the second driving motor is disposed on the base frame or the first substrate and is connected to the second substrate, and the second driving motor enables the photosensitive chip to move in a second direction by driving the second substrate;

wherein the second driving motor is disposed on the base frame, the second driving mechanism further comprises a second transmission member, the second transmission member comprises a second screw rod, a second driving board, and a second elastic member, the second substrate is provided with a second through hole, the second screw rod passes through the second through hole and is in threaded connection with the second driving board, the second driving board is in contact with the second substrate, and the second driving motor drives the second substrate to move through the second screw rod and the second driving board;

the second screw rod is capable of moving along the extension direction of the first guide post relative to the second through hole; and one end of the second elastic member is connected to the base frame and/or the first substrate, an other end of the second elastic member is connected to the second substrate, and an expansion direction of the second elastic member is parallel to the extension direction of the second guide post.

2. The camera module according to claim 1, wherein the extension direction of the first guide post intersects with the extension direction of the second guide post, the first direction intersects with the second direction, and a plane in which the first guide post and the second guide post are located is parallel to a plane in which the photosensitive chip is located.

3. The camera module according to claim 2, wherein the first driving mechanism further comprises a first transmission member, the first transmission member comprises a first screw rod, a first driving board, and a first elastic member, the first screw rod is connected to the first driving motor, the first substrate is provided with a first through hole, the first screw rod passes through the first through hole and is in threaded connection with the first driving board, the first driving board is in contact with the first substrate, and the first driving motor drives the first substrate to move through the first screw rod and the first driving board; and one end of the first elastic member is connected to the base frame, an other end of the first elastic member is connected to the first substrate, and an expansion direction of the first elastic member is parallel to the extension direction of the first guide post.

4. The camera module according to claim 3, wherein the first substrate comprises a first board body and a first extension component of the first board body extending away from a side of the base frame, the first guide post is movably connected to the first board body, the first board body moves along the extension direction of the first guide post, the first through hole is opened in the first extension component, and the first driving board is in contact with the first extension component.

5. The camera module according to claim 4, wherein a side of the first extension component towards the first driving board is provided with a first protrusion, and the first driving board is in contact with the first protrusion; or a side of the first driving board towards the first extension component is provided with a first protrusion, and the first extension component is in contact with the first protrusion.

6. The camera module according to claim 4, wherein the number of the first guide posts is at least two, the at least two first guide posts are respectively located at opposite sides of the first board body, extension directions of the at least two first guide posts are in parallel, the number of the first elastic members is at least two, and at least one first elastic member is sleeved on the first guide post.

7. The camera module according to claim 6, wherein the first board body has a first side and a second side that are disposed oppositely, the first side is provided with a first clamping component, the second side is provided with a first guide hole penetrating through the first board body, one of the first guide posts is in clamped connection with the first clamping component, and another first guide post is sleeved in the first guide hole; and one of the first elastic members is sleeved on the first guide post corresponding to the first clamping component, and one end of the first elastic member is connected to the first clamping component.

8. The camera module according to claim 3, wherein the first transmission member further comprises a first gear set, the first driving motor and the first screw rod are connected through the first gear set, and the first driving motor drives the first screw rod to rotate through the first gear set.

9. The camera module according to claim 1, wherein the second substrate comprises a second board body and a second extension component of the second board body extending away from a side of the base frame, the second guide post is movably connected to the second board body, the second through hole is opened in the second extension component, and the second driving board is in contact with the second extension component.

10. The camera module according to claim 9, wherein a side of the second extension component towards the second driving board is provided with a second protrusion, and the second driving board is in contact with the second protrusion; or a side of the second driving board towards the second extension component is provided with a second protrusion, and the second extension component is in contact with the second protrusion.

11. The camera module according to claim 9, wherein the number of the second guide posts is at least two, the at least two second guide posts are respectively located at opposite sides of the second board body, extension directions of the at least two second guide posts are in parallel, the number of the second elastic members is at least two, and at least one second elastic member is sleeved on the second guide post.

12. The camera module according to claim 11, wherein the second board body has a third side and a fourth side that are disposed oppositely, the third side is provided with a second clamping component, the fourth side is provided with a second guide hole penetrating through the second board body, one of the second guide posts is in clamped connection with the second clamping component, and another second guide post is sleeved in the second guide hole; and one end of one of the second elastic members is connected to the base frame, an other end is connected to the second substrate, and another second elastic member is sleeved on the second guide post corresponding to the second clamping component with one end being connected to the first substrate and an other end being connected to the second clamping component.

13. The camera module according to claim 1, wherein the second transmission member further comprises a second gear set, the second driving motor and the second screw rod are connected through the second gear set, and the second driving motor drives the second screw rod to rotate through the second gear set.

14. An electronic device, comprising a camera module, wherein the camera module comprises a base frame, a photosensitive chip, a first substrate, a first driving mechanism, a first guide post, a second substrate, a second guide post, and a second driving mechanism, wherein the first guide post is disposed on the base frame, the first substrate is movably connected to the first guide post, and the first substrate is capable of moving along an extension direction of the first guide post;

the photosensitive chip is disposed on the second substrate, the second guide post is disposed on the first substrate, the second substrate is movably connected to the second guide post, and the second substrate moves along an extension direction of the second guide post;

the first driving mechanism comprises a first driving motor, the first driving motor is disposed on the base frame and is connected to the first substrate, and the first driving motor drives the second substrate and the photosensitive chip to move in a first direction by driving the first substrate to move; and the second driving mechanism comprises a second driving motor, the second driving motor is disposed on the base frame or the first substrate and is connected to the second substrate, and the second driving motor enables the photosensitive chip to move in a second direction by driving the second substrate;

wherein the second driving motor is disposed on the base frame, the second driving mechanism further comprises a second transmission member, the second transmission member comprises a second screw rod, a second driving board, and a second elastic member, the second substrate is provided with a second through hole, the second screw rod passes through the second through hole and is in threaded connection with the second driving board, the second driving board is in contact with the second substrate, and the second driving motor drives the second substrate to move through the second screw rod and the second driving board;

the second screw rod is capable of moving along the extension direction of the first guide post relative to the second through hole; and one end of the second elastic member is connected to the base frame and/or the first substrate, an other end of the second elastic member is connected to the second substrate, and an expansion direction of the second elastic member is parallel to the extension direction of the second guide post.

15. The electronic device according to claim 14, wherein the extension direction of the first guide post intersects with the extension direction of the second guide post, the first direction intersects with the second direction, and a plane in which the first guide post and the second guide post are located is parallel to a plane in which the photosensitive chip is located.

16. The electronic device according to claim 15, wherein the first driving mechanism further comprises a first transmission member, the first transmission member comprises a first screw rod, a first driving board, and a first elastic member, the first screw rod is connected to the first driving motor, the first substrate is provided with a first through hole, the first screw rod passes through the first through hole and is in threaded connection with the first driving board, the first driving board is in contact with the first substrate, and the first driving motor drives the first substrate to move through the first screw rod and the first driving board; and one end of the first elastic member is connected to the base frame, an other end of the first elastic member is connected to the first substrate, and an expansion direction of the first elastic member is parallel to the extension direction of the first guide post.

17. The electronic device according to claim 16, wherein the first substrate comprises a first board body and a first extension component of the first board body extending away from a side of the base frame, the first guide post is movably connected to the first board body, the first board body moves along the extension direction of the first guide post, the first through hole is opened in the first extension component, and the first driving board is in contact with the first extension component.

18. The electronic device according to claim 17, wherein a side of the first extension component towards the first driving board is provided with a first protrusion, and the first driving board is in contact with the first protrusion; or a side of the first driving board towards the first extension component is provided with a first protrusion, and the first extension component is in contact with the first protrusion.

19. The electronic device according to claim 17, wherein the number of the first guide posts is at least two, the at least two first guide posts are respectively located at opposite sides of the first board body, extension directions of the at least two first guide posts are in parallel, the number of the first elastic members is at least two, and at least one first elastic member is sleeved on the first guide post.

\* \* \* \* \*